(12) United States Patent
Guo et al.

(10) Patent No.: US 9,366,898 B2
(45) Date of Patent: Jun. 14, 2016

(54) LIQUID CRYSTAL DISPLAY DEVICE AND METHOD FOR MANUFACTURING THE SAME

(75) Inventors: Renwei Guo, Beijing (CN); Dong Chen, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 405 days.

(21) Appl. No.: 13/698,779

(22) PCT Filed: Sep. 14, 2012

(86) PCT No.: PCT/CN2012/081429
§ 371 (c)(1),
(2), (4) Date: Nov. 19, 2012

(87) PCT Pub. No.: WO2013/037315
PCT Pub. Date: Mar. 21, 2013

(65) Prior Publication Data
US 2013/0242234 A1  Sep. 19, 2013

(30) Foreign Application Priority Data
Sep. 15, 2011 (CN) .......................... 2011 1 0272490

(51) Int. Cl.
*G02F 1/1343* (2006.01)
*G02F 1/1334* (2006.01)
(Continued)

(52) U.S. Cl.
CPC ................ *G02F 1/1334* (2013.01); *C08F 2/48* (2013.01); *G02F 1/134363* (2013.01); *C09K 19/38* (2013.01); *G02F 2001/13345* (2013.01); *G02F 2001/13775* (2013.01)

(58) Field of Classification Search
CPC .......... G02F 1/1334; G02F 2001/1334; C09K 2019/0448; C09K 19/38
USPC ........................................... 349/88
See application file for complete search history.

(56) References Cited

U.S. PATENT DOCUMENTS 6,177,972 B1  1/2001 Held et al.
2003/0064173 A1* 4/2003 Coates et al. .................. 428/1.1
(Continued)

FOREIGN PATENT DOCUMENTS

| CN | 1641425 A | 7/2005 |
| CN | 1670595 A | 9/2005 |

(Continued)

OTHER PUBLICATIONS

International Preliminary Report on Patentability dated Mar. 18, 2014; PCT/CN2012/081429.
(Continued)

*Primary Examiner* — Shean C Wu
(74) *Attorney, Agent, or Firm* — Ladas & Parry LLP

(57) ABSTRACT

According to the present invention, there are disclosed a liquid crystal display device and method for manufacturing the same. The liquid crystal display device comprises: a color filter substrate, an array substrate and a liquid crystal composite system filled between the color filter substrate and the array substrate, wherein liquid crystals and a high molecular polymer network, which is formed by polymerization of liquid crystalline polymerizable monomers, are included in the liquid crystal composite system.

15 Claims, 3 Drawing Sheets

(51) Int. Cl.
*C09K 19/38* (2006.01)
*C08F 2/48* (2006.01)
*G02F 1/137* (2006.01)

(56) References Cited

U.S. PATENT DOCUMENTS

| | | |
|---|---|---|
| 2005/0185131 A1 | 8/2005 | Miyachi et al. |
| 2006/0244887 A1 | 11/2006 | Lin et al. |
| 2010/0296040 A1* | 11/2010 | Han et al. ............. 349/139 |
| 2011/0001917 A1 | 1/2011 | Araya et al. |
| 2011/0141417 A1 | 6/2011 | Kim |
| 2013/0242234 A1 | 9/2013 | Guo et al. |
| 2014/0362334 A1 | 12/2014 | Jansen et al. |

FOREIGN PATENT DOCUMENTS

| | | |
|---|---|---|
| CN | 101158758 A | 4/2008 |
| CN | 101671565 A | 3/2010 |
| CN | 11943818 A | 1/2011 |
| CN | 101968590 A | 2/2011 |
| CN | 101566755 A | 8/2011 |
| CN | 102241988 A | 11/2011 |
| CN | 102464983 A | 5/2012 |
| CN | 102629013 A | 8/2012 |
| CN | 102643387 A | 8/2012 |
| CN | 102645778 A | 8/2012 |
| CN | 102955294 A | 3/2013 |
| EP | 0643121 A1 | 3/1995 |
| JP | 03-288823 A | 12/1991 |
| JP | 2002-122854 A | 4/2002 |
| KR | 20050075307 A | 7/2005 |
| KR | 20110004309 A | 1/2011 |

OTHER PUBLICATIONS

Korean Office Action dated Dec. 12, 2013; Appln No. 10-2012-7031662.
First Chinese Office Action dated Jan. 22, 2014; Appln. No. 201110272490.7.
Third Chinese Office Action Issued Jul. 21, 2014; Appln No. 201110272490.7.
Second Chinese Office Action Dated Apr. 25, 2014; Appln. No. 201110272490.7.
International Search Report mailed Jan. 3, 2013; PCT/CN2012/081429.
nternational Search Report mailed Jan. 2, 2014; PCT/CN2013/074964.
First Chinese Office Action dated Jan. 26, 2015; Appln. No. 201310086390.4.
International Preliminary Report on Patentability issued Sep. 22, 2015; PCT/CN2013/074964.
Partial Supplementary European Search Report dated May 8, 2015; Appln. No. 12778030.2-1904 / 2755076 PCT/CN2012081429.
Extended European Search Report dated Sep. 16, 2015; Appln. No. 12778030.2-1904 / 2755076 PCT/CN2012081429.
USPTO NFOA dated Apr. 10, 2015 in connection with U.S. Appl. No. 14/366,440.

* cited by examiner

LIQUID CRYSTAL DISPLAY DEVICE AND METHOD FOR MANUFACTURING THE SAME

CROSS REFERENCE TO RELATED APPLICATIONS

This application is a national stage application under 35 U.S.C. 371 and claims the benefit of PCT Application No. PCT/CN2012/081429 having an international filing date of Sep. 14, 2012, which designated the United States, which PCT application claimed the benefit of Chinese Application No. 201110272490.7 filed Sep. 15, 2011, the disclosure of both the above-identified applications are incorporated herein by reference.

FIELD OF THE INVENTION

Embodiments of the present invention relate to a liquid crystal display device and method for manufacturing the same.

BACKGROUND

As personal computers are becoming increasingly popularized, the liquid crystal display technology rapidly develops in the 21st century, and becomes a new star of current industry and a highlight of economic development. While the liquid crystal display is thriving, a wide viewing angle, low power consumption and fast response speed become urgent demands of liquid crystal display devices. At present, an Advanced Super Dimension Switch technology (ADSDS, briefly called as ADS) mode liquid crystal display technology has characteristics of high-speed reaction, high picture quality and large viewing angle, and is very suitable to be applied to a liquid crystal display field for various moving images. Regarding the ADS, a multi-dimensional electric field is formed by an electric field produced at edges of slit electrodes on the same plane and an electric field produced between a layer of the slit electrodes and a layer of a plate-like electrode, so as to allow liquid crystal molecules with every orientation in a liquid crystal cell, which are located directly above the electrode and between the slit electrodes, to be rotated, thereby enhancing the work efficiency of liquid crystals and increasing the transmissive efficiency. With respect to different applications, improved technologies of the ADS technology are a high-transmittance I-ADS technology, high aperture H-ADS technology, high-resolution S-ADS technology, and so on.

A liquid crystal display device in prior art is shown in FIG. 1, and comprises: an upper substrate 10 and a lower substrate 20, and alignment films disposed on the inner side of the upper substrate 10 and on the inner side of the lower substrate 20, respectively, and the alignment films at inner sides of the upper substrate 10 and the lower substrate 20 have the same orientational direction. Liquid crystals 30 are filled between the two substrates with the alignment films, and the liquid crystals 30 have long axes parallel to the orientational direction of the alignment films and are arranged regularly between the two substrates. ITO electrodes being insulated from each other are provided sequentially on the lower substrate 20. First ITO electrodes 21 being pixel electrodes, which are mutually staggered, are provided on the side of the lower substrate 20 which faces the upper substrate 10, and a plurality of pixel electrodes constitute a pixel electrode array. On the side of the lower substrate 20 which is far from the upper substrate 10, there is provided a second ITO electrode 22 being a common electrode. Further, color filters are also provided on the upper substrate 10. The electric field formed by the first ITO electrodes 21 and the second ITO electrode 22 is a multi-dimensional electric field, and the liquid crystal display device operating under the multi-dimensional electric field is an ADS mode liquid crystal display device.

When a driving voltage has not been applied to the liquid crystal display device, the liquid crystals 30 is subjected to an orientation effect of the alignment films and thus their long axes are arranged parallel to the two substrates (the upper and lower substrates), and all liquid crystals are regularly and orderly arranged between the two substrates (the upper and lower substrates), as shown in FIG. 1.

When a certain driving voltage is applied to the liquid crystal display device by the first ITO electrodes 21 and the second ITO electrode 22, a certain electric field is formed between the upper substrate 10 and the lower substrate 20. At this time, the arrangement direction of liquid crystals 30 is twisted with the electric field direction under the influence of the electric field, and size of a twisted angle of liquid crystals 30 determines transmittance of light from a backlight source passing through the display device, so as to control the display picture of the liquid crystal display device. When the driving voltage applied to the liquid crystal display device is removed, the liquid crystals 30 will slowly restore the arrangement direction before the driving voltage is applied to the liquid crystal display device, and light from the backlight source may not exit through the liquid crystals 30. The liquid crystals 30 control display of the liquid crystal display device by acting as an optical switch during power-on and power-off of the liquid crystal display device, i.e. by switching the driving voltage of the liquid crystal display device ceaselessly.

However, in terms of the existing liquid crystal display device, upon start-up, the required driving voltage is relatively large, and response speed of liquid crystals is relatively slow, and thus it may not meet requirements for low power consumption and fast response of the liquid crystal display device.

SUMMARY

According to an embodiment of the present invention, there is provided a liquid crystal display device, comprising: a color filter substrate, an array substrate and a liquid crystal composite system filled between the color filter substrate and the array substrate, wherein liquid crystals and a high molecular polymer network, which is formed by polymerization of liquid crystalline polymerizable monomers, are included in the liquid crystal composite system.

According to another embodiment of the present invention, there is provided a method for manufacturing a liquid crystal display device, comprising: adding liquid crystalline polymerizable monomers and a photo initiator into liquid crystals and conducting a stir in darkness, so as to obtain a liquid crystal composite system; applying the liquid crystal composite system between a color filter substrate and an array substrate, so as to form a primary liquid crystal display device; and radiating the primary liquid crystal display device with an ultraviolet light, so that the liquid crystalline polymerizable monomers in the liquid crystal composite system in the primary liquid crystal display device are polymerized under the effect of the photo initiator to produce a high molecular polymer network, to thereby obtain the final liquid crystal display device.

BRIEF DESCRIPTION OF THE DRAWINGS

To illustrate technical solutions in embodiments of the present invention more clearly, accompanied drawings will be briefly introduced below. Obviously, the accompanied drawings described below merely relate to some embodiments of the present invention, and are not limitation on the present invention.

DETAILED DESCRIPTION

In order to make objects, technical details and advantages of the embodiments of the invention apparent, hereinafter, technical solutions in embodiments of the present invention will be clearly and fully described in combination with the accompanied drawings in the embodiments of the present invention. Apparently, the embodiments to be described are merely a part but not all of embodiments of the present invention. Every other embodiment as would be obvious to those ordinarily skilled in the art on the basis of described embodiments in the present invention without creative work, comes within the protection scope of the present invention.

According to embodiments of the invention, there is provided a liquid crystal display device for reducing the driving voltage of the liquid crystal display device, decreasing power consumption, and enhancing response speed.

According to embodiments of the invention, power consumption of the liquid crystal display device is reduced and response speed of liquid crystals is enhanced by an orientation effect of a high molecular polymer network on the liquid crystals.

According to embodiments of the invention, liquid crystalline polymerizable monomers are added into liquid crystals. The liquid crystalline polymerizable monomers and the liquid crystals have a good solubility, and are easy to be orientated under the influence of boundary conditions. Because the liquid crystalline polymerizable monomers contain polymerizable functional groups, upon radiated by ultraviolet light, the liquid crystalline polymerizable monomers are capable of being polymerized so as to form a high molecular polymer network. The liquid crystalline polymerizable monomers are affected by an initial orientation, and can be used to effectively anchor an initial direction of small-molecule liquid crystals. During electrification, the small-molecule liquid crystals are deflected with the electric field direction under the influence of a multi-dimensional electric field, and when the electric field is removed, it is necessary for the small-molecule liquid crystals to restore such an arrangement state that their long axes are parallel to the substrate. At this time, the small-molecule liquid crystals can rapidly restore to the state before electrification under the influence of the high molecular polymer network, thereby reducing driving voltage, decreasing power consumption of the liquid crystal display device, and enhancing response speed of liquid crystals.

Figure 1:
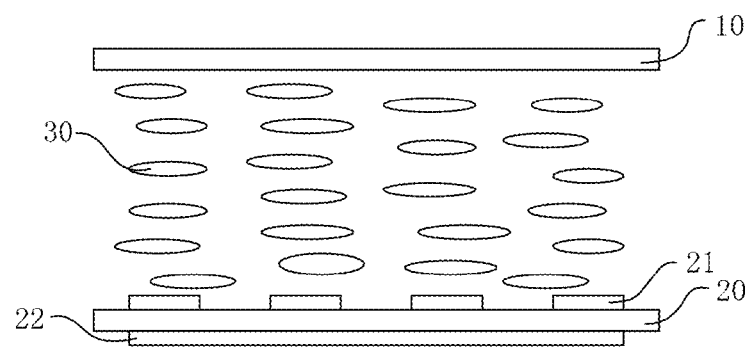
FIG. 1 is a cross-sectional view illustrating a liquid crystal display device in prior art.
Figure 2:
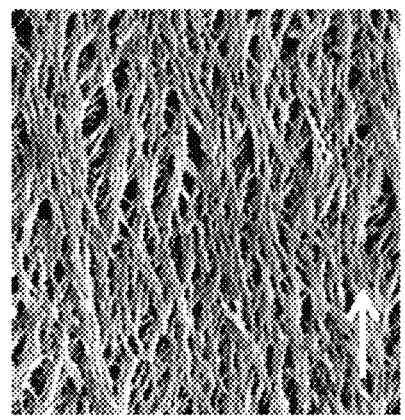
FIG. 2 is a schematic view illustrating the macrostructure of a high molecular polymer network provided by an embodiment of the invention.

In embodiments of the invention, the liquid crystalline polymerizable monomers have liquid crystallinity per se, and their arrangement in liquid crystals has directionality. Thus, the high molecular polymer network after polymerization also has the directionality. FIG. 2 shows the high molecular polymer network in an embodiment of the invention. The white arrow in FIG. 2 denotes a rubbing direction of an alignment layer of the liquid crystal display device (namely, an orientation direction of the alignment layer after treatment). As can be seen from FIG. 2, a stripe direction of the high molecular polymer network (namely, an extending direction of a polymer main chain in the polymer network) is substantially parallel to the rubbing direction of the alignment layer. The liquid-crystal arrangement direction for the small molecules can be anchored by the high molecular polymer network.

The above-mentioned directionality of the high molecular polymer has a relationship with the formation process of the high molecular polymer. Arrangement of liquid crystal molecules are induced by the rubbing direction of the alignment layer, arrangement of the liquid crystalline polymerizable monomers is induced by the arrangement of liquid crystal molecules, and arrangement direction of the generated high molecular network is induced by arrangement direction of the liquid crystalline polymerizable monomers.

Specifically, a planar inducement for liquid crystals, which is offered by the rubbed alignment layer, makes long axes of the liquid crystal molecules being arranged in parallel to the substrate. The liquid crystalline polymerizable monomers also have liquid crystallinity per se, so that long axes of the polymerizable monomers are arranged in parallel to the liquid crystal molecules. After polymerization in ultraviolet light, the high molecular polymer network generated by the liquid crystalline polymerizable monomers extends along direction of the long axes of the liquid crystal molecules, i.e. the high molecular polymer network has the directionality. Thus, the extending direction of the polymer main chain in the high molecular polymer network is substantially the same as the rubbing direction of the alignment layer.

The direction of the high molecular polymer network is determined by the liquid crystalline polymerizable monomers prior to polymerization, the arrangement direction of the liquid crystalline polymerizable monomers is determined by the arrangement direction of the liquid crystal molecules, and the arrangement direction of the liquid crystal molecules is determined by the rubbing direction.

It should be noted that, the rubbing direction of the alignment films has been described as an example above. However, as would be appreciated by those skilled in the art, alignment function of the alignment films not only can be formed by the rubbing method, but also can be realized by means of UV light irradiation, nanoimprint, and so on. According to the invention, there is no specific limitation on implementation means of the alignment function of the alignment films. For the alignment films, no matter the alignment function is realized in dependence on whatever method, it possesses an orientational direction. The orientational direction of the alignment films refers to a long-axis direction of liquid crystal molecules taken by liquid crystals under the influence of the alignment function of the alignment films in a state that the voltage has not been applied. In embodiments of the invention, the extending direction of the polymer main chain in the generated high molecular polymer network is substantially parallel to the orientational direction of the alignment films.

Hereinafter, technical solutions provided by the embodiments of the invention will be explained in combination with accompanied drawings.

Figure 3:
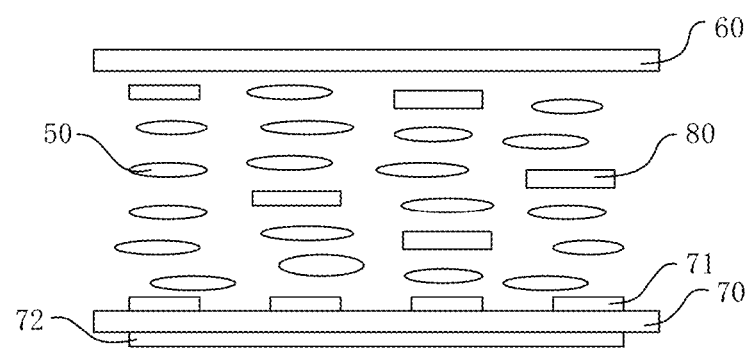
FIG. 3 is a cross-sectional view illustrating a liquid crystal display device containing liquid crystalline polymerizable monomers prior to polymerization of the liquid crystalline polymerizable monomers, which is provided by the embodiment of the invention.

In an embodiment of the invention, firstly, a photo initiator and liquid crystalline polymerizable monomers are uniformly mixed in liquid crystals at a certain ratio, respectively, so as to form a liquid crystal composite system. The liquid crystal composite system is applied (for example, dropping) between a color filter substrate and an array substrate. Referring to FIG. 3, the liquid crystal display device at this time comprises: a color filter substrate 60, a pixel electrode 71, an insulating layer 70 and a common electrode 72. Above the pixel electrode 71, there is further provided an alignment film, and under the common electrode 72, there is further provided a glass substrate. The alignment film, common electrode, insulating layer, pixel electrode and glass substrate constitute the array substrate. Further, an alignment film is also provided on the color filter substrate 60 (namely, on a side facing the array substrate). Materials for the pixel electrode 71 and the common electrode 72 each can be ITO, but also can be other transparent conductive materials. The pixel electrode 71 is formed by a plurality of strip electrodes, and there are slit-like openings between the plurality of strip electrodes. The common electrode 72 may cover the whole pixel region.

Figure 4:
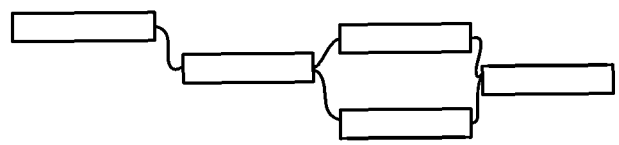
FIG. 4 is a schematic view illustrating the microstructure of the high molecular polymer network provided by the embodiment of the invention.

In the embodiment of the invention, the liquid crystal composite system, which is formed by liquid crystals 50, liquid crystalline polymerizable monomers 80 and the photo initiator (not shown in FIG. 3), is included between the color filter substrate 60 and the array substrate. Ultraviolet light is used to irradiate the liquid crystal composite system, so that the liquid crystalline polymerizable monomers 80 in the liquid crystal composite system form a high molecular polymer network under the effect of the photo initiator. FIG. 4 is a schematic view showing the microstructure of the high molecular polymer network. The high molecular polymer network is a stereoscopic network structure, and liquid crystals are filled in the network structure and its surroundings. In the molecular structure at a boundary of the high molecular polymer network (the boundary between the high molecular polymer network and liquid crystal molecules) provided by the embodiment of the invention, rigid functional groups and flexible functional groups are included. The rigid functional groups determine an anchoring function of the network on the liquid crystal molecules. The rigid functional groups comprise diphenyl functional groups, and the flexible functional groups comprise alkyl functional groups.

Figure 5:
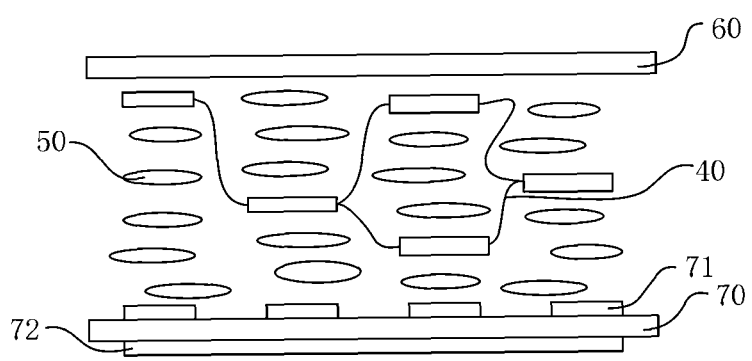
FIG. 5 is a cross-sectional view illustrating the liquid crystal display device containing liquid crystalline polymerizable monomers after polymerization of the liquid crystalline polymerizable monomers, which is provided by the embodiment of the invention.

Referring to FIG. 5, after formation of the high molecular polymer network, the liquid crystal display device provided by the embodiment of the invention comprises: a high molecular polymer network 40 and liquid crystals 50 which are distributed in the high molecular polymer network 40 and its surroundings, and arrangement of molecules of all the liquid crystals 50 is shown in a nematic structure. The liquid crystals 50 and the high molecular polymer network 40 are distributed between the color filter substrate and the array substrate. Specifically, they are distributed between the alignment film of the color filter substrate and the alignment film of the array substrate.

The high molecular polymer network 40 together with the alignment film of the color filter substrate and the alignment film of the array substrate has an orientational function on the liquid crystals 50 distributed at their surroundings, and other liquid crystal molecules far from the high molecular polymer network and the alignment films are all parallel to the liquid crystal molecules close to the high molecular polymer network and the alignment films under the influence of intermolecular van der Waals forces. The high molecular polymer network is formed by polymerization of liquid crystalline polymerizable monomers having rigidity (rigid molecular chains), its flexible part takes a very small percentage in the network, and the high molecular polymer network having an orientation function on the liquid crystal moleculars is mainly constituted by the rigid molecular chains taking a very large percentage in the network. Therefore, orientational directions of the alignment films and the high molecular polymer network for liquid crystals are consistent. The orientational function of the high molecular polymer network 40 on the liquid crystals 50 is more intensive and more effective than the orientational function of the alignment films on substrate surfaces on the liquid crystals 50, whereby it is possible that light transmittance of the liquid crystal display device is well improved, driving voltage of the liquid crystal display device is reduced, and response speed of the liquid crystal display device and other electro-optical properties are enhanced.

Referring to FIG. 5, before a driving voltage is applied to the liquid crystal display device, under the effect of the alignment films and the high molecular polymer network 40, long axes of the liquid crystals 50 are regularly and orderly arranged between the two substrates along an orientational direction parallel to the alignment films. At this time, light from a backlight source can not pass through the liquid crystals and exits.

Figure 6:
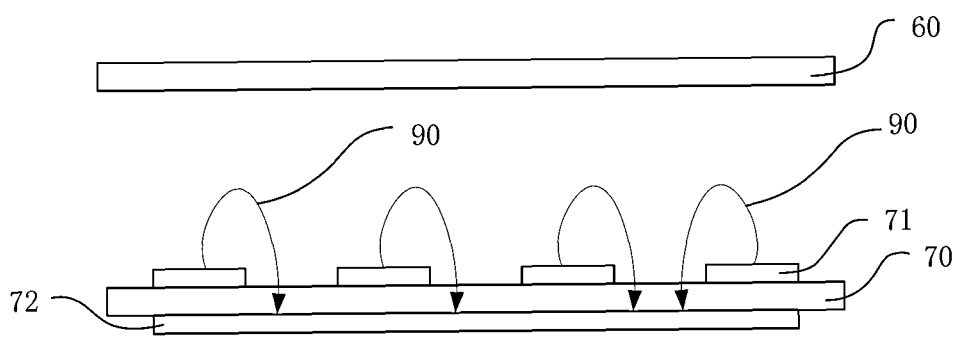
FIG. 6 is a schematic view illustrating a multi-dimensional electric field for the liquid crystal display device provided by the embodiment of the invention.
Figure 7:
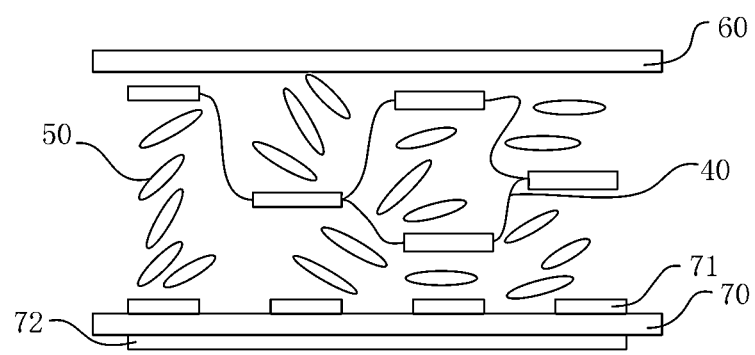
FIG. 7 is a cross-sectional view illustrating the liquid crystal display device provided by the embodiment of the invention, to which a driving voltage is applied.

When a certain driving voltage $V_{on}$ is applied to the liquid crystal display device shown in FIG. 5, i.e., a certain voltage is applied between the first ITO electrode 71 and the second ITO electrode 72, an electric field 90 as shown in FIG. 6, which is a multi-dimensional electric field, is formed. Under the effect of the electric field 90, arrangement direction of the liquid crystals 50 is twisted at a certain angle with the electric field direction, and a cross-sectional view of the liquid crystal display device at this time is shown in FIG. 7. The transmittance of light from the backlight source is determined by the twisted angle of the liquid crystals, so as to control display picture of the liquid crystal display device.

When a switch-off voltage $V_{off}$ is applied to the liquid crystal display device, under the $V_{off}$, the orientational function of the high molecular polymer network and the orientational function of the alignment films can restore the liquid crystals 50 at a faster speed to the arrangement direction of liquid crystals before the driving voltage is applied to the liquid crystal display device. As compared with the orientational function of the alignment films in the liquid crystal display device, the orientational function of the high molecular polymer network 40 on the liquid crystals 50 is more intensive and effective. Thus, as compared to prior art, the high molecular polymer network in the liquid crystal display device restores arrangement direction of liquid crystals to the arrangement direction prior to electrification swiftly at a smaller $V_{off}$. As such, an object of high-quality picture display can be achieved with a smaller power consumption at a shorter time, and response speed of the liquid crystal display device is enhanced.

Preferably, in the high molecular polymer network 40 provided by embodiments of the invention, the chemical composition for a boundary of the high molecular polymer network in a straight-line shape mainly includes: benzene rings having a certain rigidity in the liquid crystalline polymerizable monomers. The chemical composition for a boundary of the high molecular polymer network which has a curved-line profile mainly includes: a polymerizable functional group at the head and at the tail in the liquid crystalline polymerizable monomers, and the functional group has a certain flexible.

Because reference to structure of the liquid crystalline polymerizable monomers can affect inducement for liquid crystals offered by this polymer, when the liquid crystalline polymerizable monomers have a stronger rigidity, the anchoring function of the high molecular polymer network on the liquid crystal molecules is relatively intensive, and when the liquid crystalline polymerizable monomers have more flexible chains, the anchoring function of the high molecular polymer network on the liquid crystal molecules is relatively weak.

The structure of the high molecular polymer network 40 generated by polymerization of the liquid crystalline polymerizable monomers has irreversibility, namely, the polymeric reaction that the high molecular polymer network is generated by the liquid crystalline polymerizable monomers is irreversible. Thus, structure of the high molecular polymer network is very stable, and may not be affected by heat, light and other exterior conditions essentially.

The structure of the high molecular polymer network 40 is determined by arrangement direction of the liquid crystalline polymerizable monomers before polymerization in liquid crystals. Whether the liquid crystalline polymerizable monomers are rigid or not is determined by the molecular structure per se, and when there are more benzene rings, diphenyls, and cyclohexanes in molecules, the rigidity is relatively strong. The arrangement position and direction of the liquid crystalline polymerizable monomers are determined by the orientational direction of the alignment films. Arrangement of liquid crystal molecules is induced by the orientational direction, arrangement of the liquid crystalline polymerizable monomers is induced by the arrangement of liquid crystal molecules, and arrangement direction of the generated high molecular polymer network (namely, an extending direction of a polymer main chain) is induced by the arrangement direction of the liquid crystalline polymerizable monomers.

The liquid crystalline polymerizable monomers 80 may be 1,4-bi(4-(6'-propylene oxyl hexyloxy)benzoyloxy)-2-methylbenzene (briefly referred as C6M), and their molecular structural formula is as follows:

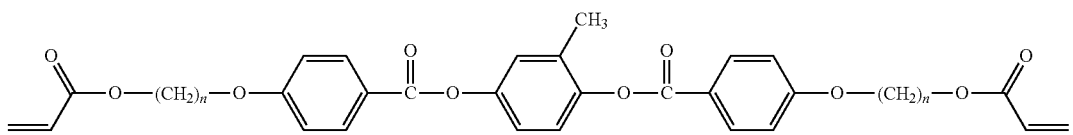

The liquid crystalline polymerizable monomers 80 may also be derivatives of the C6M, and their molecular structural formulae are as follows, respectively:

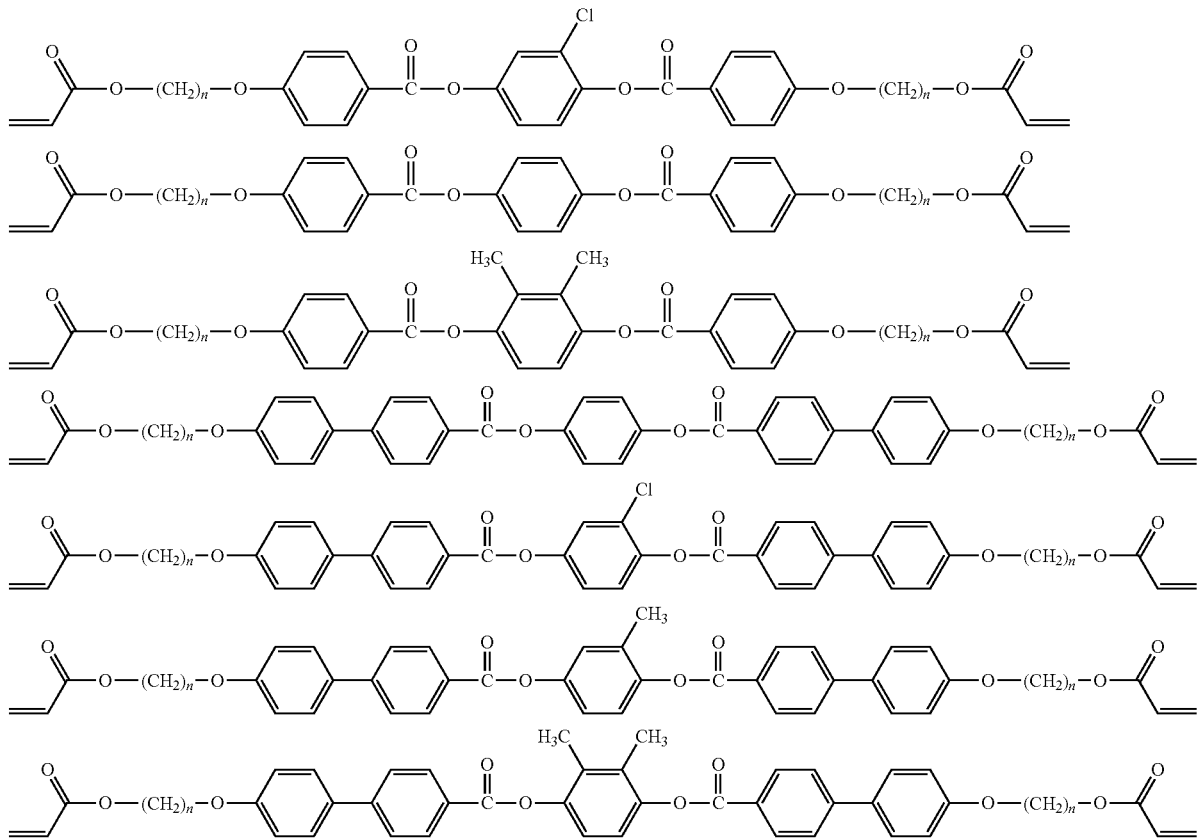

When n=6:

the first molecular structural formula is: 1,4-bi(4-(6'-propylene oxyl hexyloxy)benzoyloxy)-2-chlorobenzene;

the second molecular structural formula is: 1,4-bi(4-(6'-propylene oxyl hexyloxy)benzoyloxy)-benzene;

the third molecular structural formula is: 1,4-bi(4-(6'-propylene oxyl hexyloxy)benzoyloxy)-2,3-dimethyl benzene;

the fourth molecular structural formula is: 1,4-bi(4-(6'-propylene oxyl hexyloxy)biphenyl methanoyl)-2-benzene;

the fifth molecular structural formula is: 1,4-bi(4-(6'-propylene oxyl hexyloxy)biphenyl methanoyl)-2-chlorobenzene;

the sixth molecular structural formula is: 1,4-bi(4-(6'-propylene oxyl hexyloxy)biphenyl methanoyl)-2-methylbenzene;

the seventh molecular structural formula is: 1,4-bi(4-(6'-propylene oxyl hexyloxy)biphenyl methanoyl)-2,3-dimethyl benzene.

When n=other value, corresponding derivatives of the aforementioned formulae may also be obtained, and these derivatives can also be used as the liquid crystalline polymerizable monomers likewise. For example, n may also be 2, 4, 10, or the like.

The liquid crystalline polymerizable monomers C6M and their derivatives are easy to be mixed with liquid crystals, and are easy to be oriented under the influence of boundary conditions (alignment films). The liquid crystalline polymerizable monomers C6M and derivatives of C6M and a photo initiator tend to generate a high molecular polymer network after being irradiated by ultraviolet light.

In the molecular structural formulae of the liquid crystalline polymerizable monomers, a benzene-ring part is a rigid radical, and a carbon-chain part at two ends is a soft-chain part.

Polymer Dispersed Liquid Crystals (PDLCs) in prior art are polymer stabilized liquid crystals, and their characteristics are: they have higher levels of polymer content, and secondly, polymers do not have liquid crystallinity. While what are provided by embodiments of the invention are polymer network stabilized liquid crystals (PSLC), which have lower levels of content of the liquid crystalline polymerizable monomers. As shown in the above formulae, such a structure firstly has the liquid crystallinity and contains a double bond, which differs from polymers in PDLC. Further, liquid crystalline polymerizable monomers of this kind will be directionally arranged under the inducement of small-molecular liquid crystals, namely, arranged along directors of the small-molecular liquid crystals. During polymerization, due to an initial arrangement manner of the liquid crystalline polymerizable monomers, the liquid crystalline polymerized network is induced to be directionally arranged.

The photo initiator in the embodiment of the invention may be benzoyl peroxide, lauroyl peroxide, azobisisobutyronitrile, azo-bis-iso-heptonitrile, diisopropyl peroxydicarbonate, dicyclohexyl peroxydicarbonate or the like. These photo initiators form some free radicals upon being radiated by ultraviolet light, so as to initiate polymerization of the liquid crystalline polymerizable monomers.

Preferably, the liquid crystal display device provided by the embodiment of the invention is an Advanced Super Dimensional Switch (ADS) mode liquid crystal display device. Specifically, it may be, for example, a High aperture Fringe Field Switch (HADS) mode liquid crystal display device.

In conclusion, as an alignment layer is coated on the array substrate in the embodiments of the invention, liquid crystals can be induced to exercise a planar orientation by a rubbing function, and the polymerizable monomers in the liquid crystals have the liquid crystallinity and are capable of being arranged along the arrangement direction of long axes of other liquid crystal molecules. In the manufacturing process, radiation from ultraviolet light can make the polymerizable monomers being polymerized, and the generated high molecular polymer network has directionality. Because long axes of the liquid crystal molecules in an ADS display mode are parallel to the substrate, the formed high molecular polymer network can facilitate molecular rotation of the liquid crystal molecules in an electric field. Thus, power consumption of the liquid crystal display device is decreased.

It should be noted that, the high molecular polymer network as stated by the embodiments of the invention not only has a function of reducing power consumption for the above liquid crystal display devices in the ADS display mode, but has the function of reducing power consumption for common nematic mode liquid crystal devices likewise. For example, in liquid crystal displays in a vertical electric field mode or liquid crystal displays in a lateral electric field mode such as a planar field switching or a fringe field switching, because an extending direction of the polymer main chain of the high molecular polymer network is consistent with an orientational direction of alignment films, the high molecular polymer network and the alignment films each have an alignment function for the liquid crystal molecules. Accordingly, it is also possible that the driving voltage is reduced, the power consumption is decreased and the response speed is enhanced.

According to an embodiment of the invention, there is provided a method for manufacturing a liquid crystal display device, comprising the following steps:

S101, liquid crystalline polymerizable monomers and an optical initiator are added into liquid crystals and a stir is conducted in darkness, so as to obtain a liquid crystal composite system;

wherein, the photo initiator may be, such as an initiator 651 (Irgacure 651), etc.

S102, the liquid crystal composite system is applied (for example, dropping) between a color filter substrate and an array substrate, so as to form a primary liquid crystal display device;

S103, the primary liquid crystal display device is irradiated by an ultraviolet light, so that liquid crystalline polymerizable monomers in the liquid crystal composite system in the primary liquid crystal display device are polymerized under the effect of the photo initiator to produce a high molecular polymer network, to thereby obtain the final liquid crystal display device;

wherein, in the case that the time for irradiating the primary liquid crystal display device with the ultraviolet light is about ten minutes or so, the generated high molecular polymer network has a good effect.

Specifically, according to an embodiment of the invention, there is provided a method for manufacturing a liquid crystal display device, comprising the following steps:

S201, liquid crystalline polymerizable monomers are added into liquid crystals at a predetermined ratio;

wherein, content of the liquid crystalline polymerizable monomers is higher, meshes of a generated high molecular polymer network are denser; and content of the liquid crystalline polymerizable monomers is lower, meshes of the high molecular polymer network, which is generated by polymerization after radiated by irradiation light, are sparser.

The content of the liquid crystalline polymerizable monomers is not suitable to be too high, when content of the liquid crystalline polymerizable monomers is less than 10% of mass of liquid crystals, effects of reducing driving voltage of the liquid crystal display device and enhancing response speed can be achieved by the high molecular polymer network formed by the liquid crystalline polymerizable monomers, and when content of the liquid crystalline polymerizable monomers is 4% to 8% of mass of liquid crystals, the effects are more apparent.

S202, a photo initiator is added at a determined ratio into the mixture of the liquid crystalline polymerizable monomers and liquid crystals, which is obtained by the step S101;

wherein, the content of the photo initiator is not suitable to be too high, when content of the photo initiator is more than 20% of mass of the liquid crystalline polymerizable monomers, a phenomenon that yellowing takes place in the liquid crystal display device will occur, so as to affect the display effect of the liquid crystal display device; and when content of the photo initiator is 1% to 20% of mass of the liquid crystalline polymerizable monomers, the display effect of the obtained liquid crystal display device is good. Wherein, when the photo initiator accounts for 1% of the polymerizable monomers, the effect is better.

S203, the liquid crystal composite system containing the liquid crystalline polymerizable monomers and the photo initiator, which is obtained by the step S202, is made to be uniform by stirring in darkness.

S204, the liquid crystal composite system which becomes uniform by stirring is pressed between a color filter substrate and an array substrate under vacuum. Wherein, the color filter substrate and the array substrate adopt a planar-alignment manner, and this manner can induce a regular arrangement of the liquid crystalline polymerizable monomers.

Because inner surfaces of the color filter substrate and the array substrate are orientated by PI rubbing, the liquid crystalline polymerizable monomers are affected by arrangement of small-molecule liquid crystals prior to polymerization and their long axes are parallel to the color filter substrate and the array substrate.

S205, the liquid crystal display device formed by the step S204 is radiated by ultraviolet light, so as to form a liquid crystal display device of the liquid crystal composite system containing a high molecular polymer network, wherein the liquid crystal composite system containing the high molecular polymer network further contain very little photo initiator, content of the photo initiator is about 0.2% of mass of liquid crystals, and has no influence on the display effect of the liquid crystal display device.

Preferably, in an alignment process of cell, the liquid crystalline polymerizable monomers are initiated by the photo initiator in a UV solidification step of a sealant, so as to form the high molecular polymer network. As such, the liquid crystalline polymerizable monomers in the composite system are polymerized under the effect of the photo initiator without the necessity of increasing ultraviolet radiation separately, to thereby enhance the production efficiency. The small-molecule liquid crystals are anchored around the high molecular polymer network, and these small-molecule liquid crystals are oriented in parallel to the substrate under the influence of initial conditions.

During electrification, the small-molecule liquid crystals are influenced by a multi-dimensional electric field to be deflected, and when the electric field is removed, it is necessary for the small-molecule liquid crystals to restore such an arrangement state that their long axes are parallel to the substrate. At this time, by influence of the high molecular polymer network, the small-molecule liquid crystals can rapidly restore to the state before electrification, thereby decreasing power consumption of the device.

This method of reducing power consumption of the liquid crystal display device is suitable for HADS design. Firstly, among an array 2D design, a color filter substrate and an array substrate have the same PI rubbing direction, so that polymerized monomers and liquid crystal molecules in a liquid crystal cell have a uniform arrangement direction before polymerization, and during polymerization, disturbance to small-molecule liquid crystals is less in the course of extending of polymer chains. Secondly, because the electric field distribution upon electrification is regular for ADS and the small-molecule liquid crystals are prompted to rotate, it is easier for the polymer network to reduce $V_{off}$.

This method of reducing power consumption of the liquid crystal display device is suitable for a TN mode (nematic mode) liquid crystal display device. Due to a similar effect of directional polymerization, similar effects of reducing driving voltage, decreasing power consumption of the liquid crystal display device, and enhancing response speed of liquid crystals are thus provided.

The order of the above steps S201 and S202 may also be interchanged. It is possible that the step S202 is performed earlier, and the step S201 is performed later, namely, the photo initiator is added into liquid crystals at a suitable ratio earlier, and the liquid crystalline polymerizable monomers are added into the liquid crystals at a suitable ratio later.

Alternatively, the photo initiator and the liquid crystalline polymerizable monomers may also be added into liquid crystals at the same time.

In embodiments of the invention, when end groups of liquid crystal molecules contain a cyano radical, the end groups of the liquid crystal molecules have a stronger electron-withdrawing capability, and they are much influenced by electric field function; and when the electron-withdrawing radical in liquid crystal molecules is fluorine, their electron-withdrawing capability is weaker, and they are less influenced by the electric field function. The kind of the liquid crystalline polymerizable monomers used in embodiments of the invention can differ in accordance with different kinds of liquid crystals (structure of liquid crystal molecules), and is not limited to use of C6M and its derivatives.

In summary, according to embodiments of the invention, there are provided a liquid crystal display device comprising a liquid crystal panel, and a display apparatus containing a liquid crystal panel. The liquid crystal panel includes a color filter substrate and an array substrate, and a high molecular polymer network disposed between the color filter substrate and the array substrate and liquid crystals distributed around the high molecular polymer network. When a certain driving voltage is applied to the liquid crystal display device, arrangement direction of the liquid crystals is twisted at a certain angle with an electric field, so as to achieve an object of being pervious to light. In the course of applying a switch-off voltage to the liquid crystal display device, by influence of the high molecular polymer network, the liquid crystals restore at a faster speed to the arrangement direction of liquid crystals before the driving voltage is applied to the liquid crystal display device at a smaller switch-off voltage; and as compared to a conventional liquid crystal display device, switch-off voltage of the liquid crystal display device is reduced, power consumption is decreased, and response speed is enhanced, in accordance with technical solutions provided by embodiments of the invention.

Furthermore, according to an embodiment of the invention, there is further provided a display apparatus containing a liquid crystal panel, such as computers, televisions, etc.

It should be noted that, the above descriptions are made with reference to a parallel alignment mode in which direction of long axes of liquid crystal molecules is parallel to a substrate surface (namely, a surface of an alignment film). However, embodiments of the invention are not limited thereto. An initial orientational state of liquid crystal molecules can make a pretilt angle with the substrate surface. Alternatively, embodiments of the invention may also adopt such a mode that liquid crystal molecules are arranged perpendicular to a substrate surface in an initial state (namely, a vertical alignment mode). However, no matter which alignment mode is used, the initial orientational state of the liquid crystal molecules is consistent with an orientational direction of the alignment film, and an extending direction of the polymer main chain of the high molecular polymer network is also consistent with the orientational direction of the alignment film.

Apparently, various modifications and variances can be made by those skilled in the field without departing from the spirit and scope of the present invention. As such, provided that these modifications and variances come within the scope of claims of the present invention and the equivalent technologies thereof, these modifications and variances are intended to be embraced within the present invention.

What is claimed is:

1. A liquid crystal display device, comprising: a color filter substrate, an array substrate and a liquid crystal composite system filled between the color filter substrate and the array substrate,
   wherein liquid crystals and a high molecular polymer network, which is formed by polymerization of liquid crystalline polymerizable monomers, are included in the liquid crystal composite system,
   wherein the liquid crystals are distributed in the high molecular polymer network and its surroundings,
   wherein mass of the liquid crystalline polymerizable monomers is 4% to 8% of mass of the liquid crystals.

2. The device claimed as claim 1, wherein the high molecular polymer network has directionality.

3. The device claimed as claim 1, wherein an alignment layer is disposed on at least one of opposed surfaces of the color substrate and the array substrate, the alignment layer has an orientational direction, and an extending direction of a polymer main chain in the high molecular polymer network is substantially parallel to the orientational direction of the alignment film.

4. The device claimed as claim 3, wherein the extending direction of the polymer main chain in the high molecular polymer network is determined by arrangement direction of the liquid crystalline polymerizable monomers prior to polymerization, the arrangement direction of the liquid crystalline polymerizable monomers is determined by arrangement direction of the liquid crystal molecules, and the arrangement direction of the liquid crystal molecules is determined by the orientational direction of the alignment layer.

5. The device claimed as claim 1, wherein a rigid functional group and a flexible function group are included in the molecular structure at a boundary of the high molecular polymer network, and the rigid functional group determines an anchoring function of the network on the liquid crystal molecules.

6. The device claimed as claim 5, wherein the rigid functional group comprises a diphenyl functional group, and the flexible functional group comprises an alkyl functional group.

7. The device claimed as claim 1, wherein the polymerization reaction by which the high molecular polymer network is generated by the liquid crystalline polymerizable monomers has irreversibility.

8. The device claimed as claim 1, wherein the liquid crystalline polymerizable monomers are C6M or derivatives of C6M, wherein the derivatives of C6M comprises 1,4-bi(4-(6'-propylene oxyl hexyloxy)benzoyloxy)-2-chlorobenzene; 1,4-bi(4-(6'-propylene oxyl hexyloxy)benzoyloxy)-benzene; 1,4-bi(4-(6'-propylene oxyl hexyloxy)benzoyloxy)-2,3-dimethyl benzene; 1,4-bi(4-(6'-propylene oxyl hexyloxy)biphenyl methanoyl)-2-benzene; 1,4-bi(4-(6'-propylene oxyl hexyloxy)biphenyl methanoyl)-2-chlorobenzene; 1,4-bi(4-(6'-propylene oxyl hexyloxy)biphenyl methanoyl)-2-methylbenzene; and 1,4-bi(4-(6'-propylene oxyl hexyloxy)biphenyl methanoyl)-2,3-dimethyl benzene.

9. The device claimed as claim 1, wherein on the array substrate, there are provided a pixel electrode and a common electrode, the pixel electrode and the common electrode being disposed in different layers of the array substrate; between the pixel electrode and the common electrode, there is provided an insulating layer; the common electrode covers the whole pixel region; and the pixel electrode has a slit-like opening.

10. A method for manufacturing a liquid crystal display device, comprising:
    adding liquid crystalline polymerizable monomers and a photo initiator into liquid crystals and conducting a stir in darkness, so as to obtain a liquid crystal composite system;
    applying the liquid crystal composite system between a color filter substrate and an array substrate, so as to form a primary liquid crystal display device; and
    radiating the primary liquid crystal display device with an ultraviolet light, so that the liquid crystalline polymerizable monomers in the liquid crystal composite system in the primary liquid crystal display device are polymerized under the effect of the photo initiator to produce a high molecular polymer network, to thereby obtain the final liquid crystal display device,
    wherein the liquid crystals are distributed in the high molecular polymer network and its surroundings,
    wherein mass of the liquid crystalline polymerizable monomers is 4% to 8% of mass of the liquid crystals.

11. The method claimed as claim 10, wherein on at least one of opposed surfaces of the color substrate and the array substrate, there is provided an alignment layer, and the alignment layer has an orientational direction, and
    wherein after the liquid crystal composite system is applied between the color filter and the array substrate, the liquid crystals and the liquid crystalline polymerizable monomers each are arranged along the orientational direction of the alignment film.

12. The method claimed as claim 10, wherein the step of radiating the primary liquid crystal display device with the ultraviolet light is accomplished in an ultraviolet solidification step performed on a sealant in a bonding process.

13. The method claimed as claim 10, wherein mass of the liquid crystalline polymerizable monomers is less than 10% of mass of the liquid crystals.

14. The device claimed as claim 5, wherein an extending direction of the rigid functional group is consistent with an initial alignment direction of the liquid crystal molecules, the liquid crystals are deflected along an electrical filed direction in response to the liquid crystal display device being applied with a switch-on voltage, and the liquid crystals return to the initial alignment direction under influence of the high molecular polymer network in response to the liquid crystal display device being applied with a switch-off voltage.

15. The method claimed as claim 10, wherein a rigid functional group and a flexible function group are included in the molecular structure at a boundary of the high molecular polymer network, and the rigid functional group determines an anchoring function of the network on the liquid crystal molecules, wherein an extending direction of the rigid functional group is consistent with an initial alignment direction of the liquid crystal molecules, the liquid crystals are deflected along an electrical filed direction in response to the liquid crystal display device being applied with a switch-on voltage, and the liquid crystals return to the initial alignment direction under influence of the high molecular polymer network in response to the liquid crystal display device being applied with a switch-off voltage.

* * * * *